United States Patent
Garfunkel et al.

(10) Patent No.: US 9,601,138 B1
(45) Date of Patent: Mar. 21, 2017

(54) BIAS LAYER AND SHIELD BIASING DESIGN

(71) Applicant: Headway Technologies, Inc., Milpitas, CA (US)

(72) Inventors: Glen Garfunkel, San Jose, CA (US); Yan Wu, Cupertino, CA (US); Junjie Quan, Fremont, CA (US); Yewhee Chye, Hayward, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/848,376

(22) Filed: Sep. 9, 2015

(51) Int. Cl.
*G11B 5/39* (2006.01)

(52) U.S. Cl.
CPC .......... *G11B 5/3912* (2013.01); *G11B 5/3951* (2013.01); *G11B 5/3954* (2013.01)

(58) Field of Classification Search
None
See application file for complete search history.

(56) References Cited

U.S. PATENT DOCUMENTS

| | | | |
|---|---|---|---|
| 5,742,459 A | 4/1998 | Shen et al. | |
| 7,203,039 B2* | 4/2007 | Wang | B82Y 10/00 360/324.11 |
| 8,462,467 B2 | 6/2013 | Yanagisawa et al. | |
| 8,514,524 B2 | 8/2013 | Wu et al. | |
| 8,576,518 B1* | 11/2013 | Zeltser | G11B 5/3912 360/319 |
| 8,611,054 B1 | 12/2013 | Shang et al. | |
| 8,638,530 B1* | 1/2014 | Hsu | G11B 5/3912 360/319 |
| 8,824,106 B1* | 9/2014 | Garfunkel | G11B 5/2654 360/316 |
| 8,873,204 B1* | 10/2014 | Gao | G11B 5/3912 360/319 |
| 9,001,472 B2* | 4/2015 | Singleton | G11B 5/3912 360/319 |
| 9,042,059 B1* | 5/2015 | Katine | G11B 5/3909 360/316 |

(Continued)

OTHER PUBLICATIONS

Co-pending U.S. Patent HT14-029, U.S. Appl. No. 14/848,374, filed Sep. 9, 2015, "Shield Biasing Design for Magnetic Recording Head," by Glen Garfunkel et al., 15 pgs.

*Primary Examiner* — Will J Klimowicz
(74) *Attorney, Agent, or Firm* — Saile Ackerman LLC; Stephen B. Ackerman

(57) ABSTRACT

A read head is longitudinally biased unidirectionally by laterally abutting soft magnetic layers or multilayers. The soft magnetic layers are themselves magnetically stabilized by layers of antiferromagnetic material that are exchange coupled to them. The same layers of antiferromagnetic materials can be used to stabilize a unidirectional anisotropy of an overhead shield by means of exchange coupling. By including the antiferromagnetic material layer within the patterned biasing structure itself, an additional layer of antiferromagnetic material that normally covers the entire sensor structure is eliminated. The elimination of an entire layer is also advantageous for reducing the inter-sensor spacing in a TDMR (two dimensional magnetic recording) configuration where two sensor are vertically stacked on top of each other.

11 Claims, 3 Drawing Sheets

(56) References Cited

U.S. PATENT DOCUMENTS

| | | | |
|---|---|---|---|
| 2011/0051291 A1* | 3/2011 | Miyauchi | B82Y 10/00 360/245.3 |
| 2012/0250189 A1* | 10/2012 | Degawa | G01R 33/093 360/235.4 |
| 2014/0153137 A1* | 6/2014 | McKinlay | G11B 5/3912 360/235.4 |
| 2014/0153138 A1* | 6/2014 | Le | G11B 5/3909 360/294 |
| 2014/0168822 A1 | 6/2014 | Le et al. | |
| 2014/0252517 A1* | 9/2014 | Zhang | G11B 5/3932 257/422 |
| 2014/0252518 A1* | 9/2014 | Zhang | H01L 43/12 257/422 |
| 2015/0062751 A1 | 3/2015 | Le et al. | |
| 2015/0098155 A1* | 4/2015 | Lapicki | G01R 33/093 360/319 |
| 2015/0116867 A1* | 4/2015 | Childress | G11B 5/3906 360/319 |
| 2015/0248903 A1* | 9/2015 | Aoyama | G11B 5/398 360/99.08 |
| 2015/0325260 A1* | 11/2015 | Singleton | G11B 5/3932 360/319 |
| 2015/0332713 A1* | 11/2015 | Du | G11B 5/3912 360/319 |
| 2015/0371666 A1* | 12/2015 | Xiao | G11B 5/11 360/319 |

* cited by examiner

BIAS LAYER AND SHIELD BIASING DESIGN

RELATED PATENT APPLICATIONS

This Application is related to Ser. No. 14/848,374 Filing Date: Sep. 9, 2015, assigned to a common assignee and incorporated herein by reference.

BACKGROUND

1. Technical Field

This disclosure relates generally to thin-film magnetoresistive read sensors and particularly to the use of biasing layers to stabilize magnetic freelayers in configurations that implement "two dimensional magnetic recording".

2. Description

Magnetic recording heads can bias the reader freelayer by means of the fringe field of the so-called bias layers. This approach is taught by Yanagisawa et al. (U.S. Pat. No. 8,462,467 B2). The bias layer itself is usually a soft magnetic material, and needs to be stabilized by means of magnetic coupling, usually exchange coupling, to another $2^{nd}$ magnetic layer which is itself stabilized by some means. Usually this $2^{nd}$ magnetic layer is the upper shield (just above the bias layer) and is itself stabilized by an antiferromagnetic layer such as IrMn, as is taught by Garfunkel et al. (U.S. Pat. No. 8,514,524 B2).

It is instructive to examine the approach of Yanagasawa a bit more closely by examination of an illustration of the structure taught by him in schematic FIG. 1. Referring to schematic FIG. 1, there is shown a longitudinally biased sensor arrangement. The patterned multilayered sensor structure (layers not shown in detail) is labeled 20. An insulating layer, 70, electrically isolates the sensor from symmetrically placed laterally disposed biasing layers, each labeled 60. An upper shield is 50, and a lower shield is 40. The two layers, 60, that are the biasing layer elements, are always soft magnetic films. A stabilizing or unidirectional anisotropy (shown by arrows in 50 and 60) is provided by shield 50 to biasing layers 60 and the shield anisotropy is itself pinned by exchange coupling to the top layer C, labeled 30, which is usually an antiferromagnetic (AFM) layer of IrMn.

Referring next to FIG. 2, there is shown another prior art scheme, this one with multilayer biasing. Note that biasing layer, bracketed as 60, is now formed as a synthetic antiferromagnetic (SyAFM) laminate of two antiferromagnetically coupled layers 62 and 66, (their oppositely directed magnetic anisotropies shown as arrows), separated by an exchange coupling layer 64. But the biasing layers are always soft magnetic material which may be coupled by an exchange coupling layer typically Ru, at positions 64 and 80. The exchange coupling layer 80 provides a coupling to upper shield 50. Whether a single soft magnetic layer is used for biasing as in FIG. 1, or a coupled lamination as in FIG. 2, unidirectional stabilization is ultimately provided by AFM layer 30, also labeled C.

Schemes such as this may work well when there are no geometry constraints and there is room for the antiferromagnetic film, C. However, for so called Two Dimensional Magnetic Recording (TDMR) designs, which employ two sensor structures formed one over the other, Garfunkel et al. (U.S. Pat. No. 8,824,106 B1) have shown that it is critical to minimize the film thicknesses and, correspondingly, the distance between the lower and upper sensors. There is a need to reduce this sensor-to-sensor distance while also providing improvements to the biasing.

SUMMARY

The object of this disclosure is to provide a read sensor that includes at least one sensor element and that is longitudinally biased to have a unidirectional magnetic anisotropy and stabilized using an intrinsic antiferromagnetic layer that allows removal of an antiferromagnetic layer previously used for stabilization.

Referring to schematic FIG. 3, there is shown a freelayer biasing scheme that supports the object described above. The structure in FIG. 3, resembles that of FIG. 1, except that a stabilizing unidirectional anisotropy is provided the sensor, 20, as a result of inserting an antiferromagnetic film, 90, above biasing layer, 61. Layer 90 is an antiferromagnetic film such as IrMn, and in one aspect of the disclosure, layer 90 exchange couples to 61, the sensor magnetic biasing layer below 90 and to layer 50, the upper shield layer above 90. As with other stabilizing antiferromagnetic films, the anisotropy direction is set by an anneal step.

Layer 90, therefore, serves two functions; it stabilizes both the biasing layer, 61, and also the upper shield, 50. It can be used in place of the antiferromagnetic film C, (30, of FIG. 1 and FIG. 2), which stabilized the upper shield layer 50, thus eliminating layer C from the structure of FIG. 3, and in TDMR cases (see FIG. 4, below) thus reducing the sensor to sensor vertical spacing.

DETAILED DESCRIPTION

Figure 3:
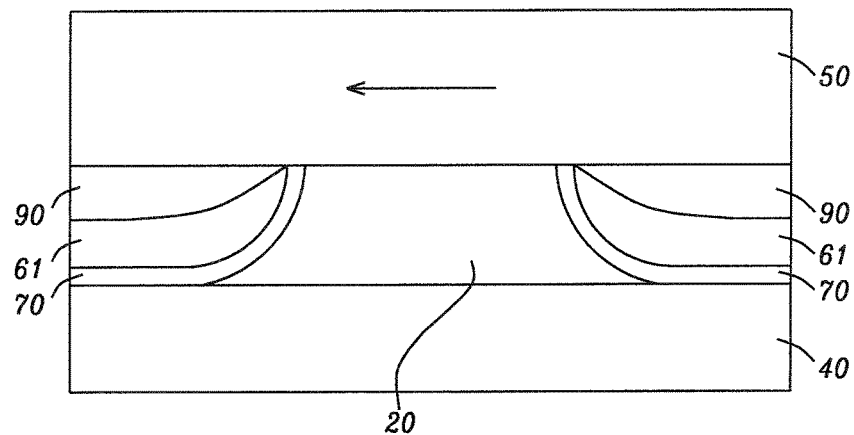
FIG. 3 is a schematic representation of a biased and stabilized sensor that satisfies the object of this disclosure.

Referring again to schematic FIG. 3, there is shown a stabilizing unidirectional magnetic anisotropy provided by insertion of layer 90, adjacent to and on top of the soft magnetic bias layer 61, which are typically layers of NiFe or CoFe formed to a thickness between approximately 40 and 125 Angstroms. Layer 90 is here a patterned AFM layer, formed into a pair of layers, longitudinally disposed and symmetrically placed on each side of the sensor, 20, over the biasing layers 61. Layer 90 is formed to a thickness of between approximately 50 and 200 Angstroms of intrinsically antiferromagnetic material, such as a layer of IrMn.

Figure 1:
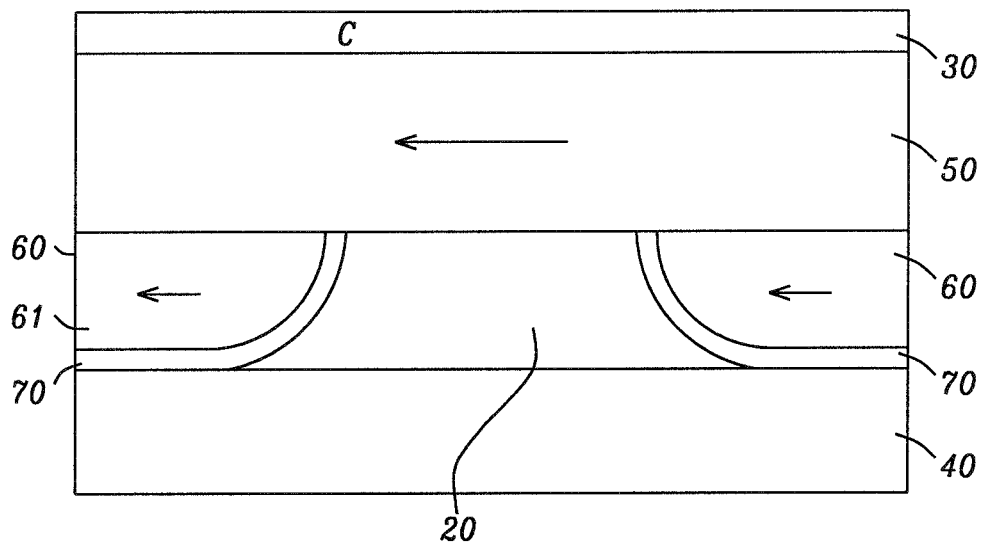
FIG. 1 is a schematic representation of an ABS view of a prior art biased and stabilized sensor.
Figure 2:
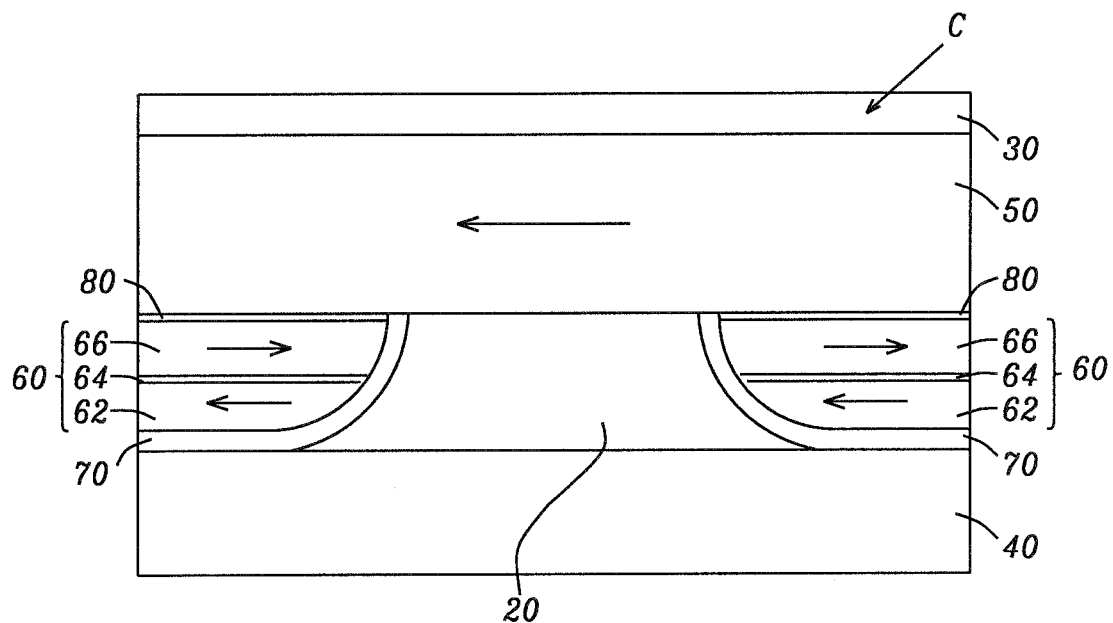
FIG. 2 is a schematic representation of an ABS view of an alternate prior art biased and stabilized sensor differing from FIG. 1 in that the biasing structure is a layered configuration.

Subsequent to an annealing process, such as a 2 hour anneal at between 200-250 deg. C. in a saturating field, each of this pair of antiferromagnetic layers 90 will exchange couple to the soft magnetic biasing layers, 61, below it to promote and stabilize unidirectional magnetic anisotropy in those layers. It should be noted that the biasing layers 61 require a large net moment in order to bias the sensor. For this reason, forming the biasing layers as synthetic antiferromagnetic structures (i.e., coupling them with opposite moments across a layer of Ru as in FIG. 2) is not preferred, although two soft layers with different thicknesses can be coupled to provide a net moment.

In addition to stabilizing the biasing layers, the pair of patterned antiferromagnetic films, 90, will be exchange coupled to the top shield, 50, thereby providing the shield with a stable unidirectional magnetic anisotropy as well. Thus, layer 90 serves two functions; it stabilizes both the pair of bias layers, 61, and also the top shield 50. It can be used in place of the antiferromagnetic film C, 30, in prior art FIG. 2 thus completely eliminating that film, and in TDMR structures thus reducing the top sensor to bottom sensor vertical spacing. It is a further aspect of the process that the antiferromagnetic films can also be sandwiched between pairs of soft magnetic biasing layers if the biasing configuration, 61, is formed as a multilayered structure rather than a single layer.

Figure 4:
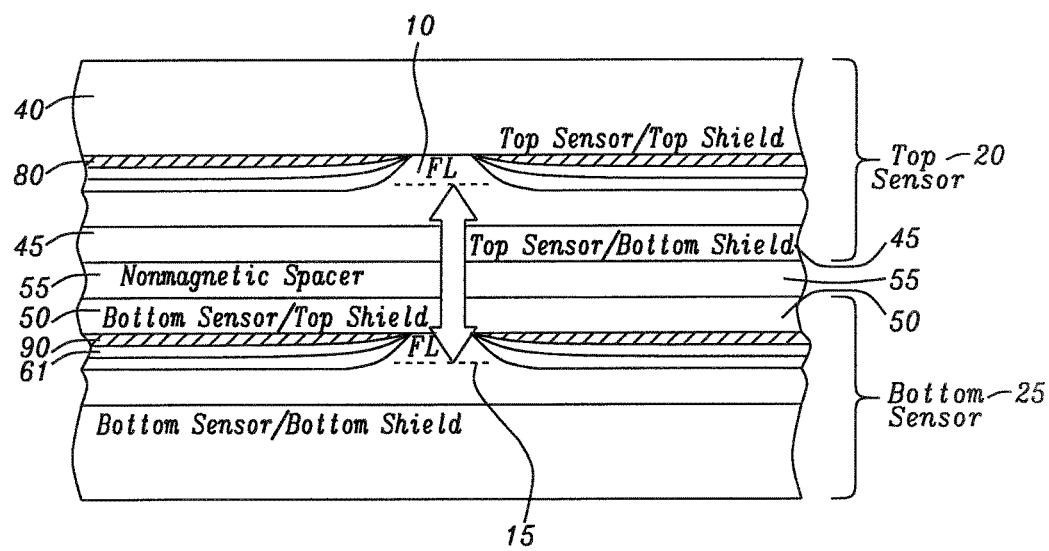
FIG. 4 is a schematic representation of a TDMR (two dimensional magnetic recording) sensor showing how the present structure, when vertically stacked, leads to a smaller separation between top and bottom sensors.

Referring finally to FIG. 4, there is shown schematically a two dimensional magnetic recording (TDMR) vertically stacked double sensor structure (top sensor 20, bottom sensor 25), having a reduced sensor-to-sensor spacing (shown by the double arrow between sensor freelayers 10 and 15) because an extra exchange coupling AFM layer, that would typically be formed on top of the top shield 50 of the bottom sensor 25, has been eliminated. This eliminated layer of AFM material is shown as layer 30 (or C) in FIG. 2. In FIG. 4, the effect of this layer is replaced by the laterally disposed symmetric pair, 90, which does double-duty of stabilizing both the soft bias layers 61 and the bottom sensor top shield 50.

Figure 5:
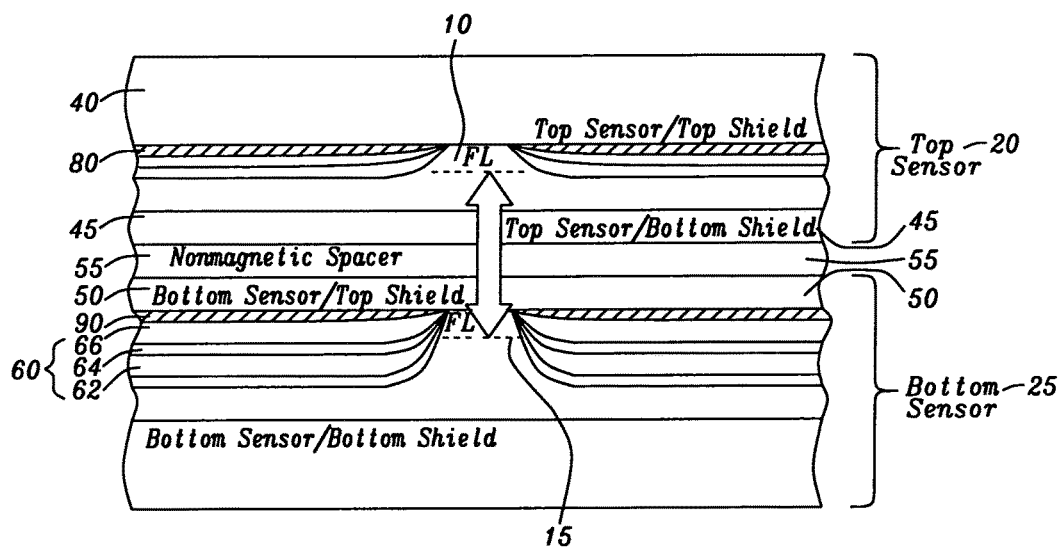
FIG. 5 shows the structure of FIG. 4 but with a soft magnetic biasing layer that is an antiferromagnetic laminate of two antiferromagnetically coupled soft layers.

As FIG. 4 illustrates, the separation between the bottom sensor and the top sensor is now a result only of the combined thicknesses of the bottom sensor top shield, 50, a non-magnetic spacer layer, 55, and the top sensor bottom shield 45. A blanket covering antiferromagnetic layer (layer 30 of FIG. 2) that would have been used to cover the top surface of the bottom sensor top shield 50 to stabilize its unidirectional anisotropy has been completely eliminated. The stabilization is now provided by layer 90, which is an antiferromagnetic layer of a material such as IrMn and which, as in FIG. 3, stabilizes the biasing layer 61 and the top shield 50. Note that we also show the presence of the AFM stabilizing layers, 80, in the top sensor, 20, but they do not contribute to the reduced inter-sensor distance although they will stabilize the top shield, 40, of the top sensor. Finally, as shown in FIG. 5, the soft magnetic biasing layer (layer 61 in FIG. 4) may alternatively be formed as a synthetic antiferromagnetic (SyAFM) laminate (as shown as layer 60 in FIG. 2) of two antiferromagnetically coupled layers, shown as 62 and 66, separated by an exchange coupling layer 64, where the two layers 62 and 66 have different thicknesses to produce a net magnetic moment.

As is understood by a person skilled in the art, the present description is illustrative of the present disclosure rather than limiting of the present disclosure. Revisions and modifications may be made to methods, materials, structures and dimensions employed in forming and providing a single or multiple sensor read head with longitudinally disposed patterned antiferromagnetic stabilized biasing layers, while still forming and providing such a structure and its method of formation in accord with the spirit and scope of the present disclosure as defined by the appended claims.

What is claimed is:

1. A TDMR (two dimensional magnetic recording) read head having longitudinally biased freelayers with unidirectional anisotropy in a longitudinal direction, comprising:
    a top sensor top shield;
    a patterned top sensor placed beneath and contiguous with said top sensor top shield, wherein said patterned top sensor includes a freelayer having a unidirectional magnetic anisotropy aligned in a horizontal direction;
    a top sensor bottom shield;
    a non-magnetic spacer layer;
    a bottom sensor top shield;
    a patterned bottom sensor placed beneath and contiguous with said bottom sensor top shield, wherein said patterned bottom sensor includes a freelayer having a unidirectional magnetic anisotropy aligned in a horizontal direction;
    a bottom sensor bottom shield; wherein
    said top and bottom sensors are identical in pattern and structure and symmetrically positioned; and
    an oppositely disposed pair of soft magnetic biasing layers or a multilayer of soft magnetic biasing layers that symmetrically abut patterned lateral sides of each said identically patterned sensor thereby stably biasing each said freelayer therein and producing said unidirectional magnetic anisotropy in each said freelayer therein; and
    a pair of symmetrically formed antiferromagnetic layers exchange coupled to said soft magnetic biasing layers or said multilayer of soft magnetic biasing layers in each said sensor, thereby stabilizing said biasing of each said freelayer therein; and wherein
    said top sensor top shield is also biased in the same direction as said freelayer in said top sensor and wherein said bottom sensor top shield is also biased in the same direction as said freelayer in said bottom sensor and wherein both said top shield of said top sensor and said top shield of said bottom sensor are exchange coupled to said pair of antiferromagnetic layers of their respective sensors and are also provided with a stabilized unidirectional magnetic anisotropy thereby.

2. The read head of claim 1 wherein each of said pair of symmetrically formed antiferromagnetic layers is formed on top of said soft magnetic biasing layers or said multilayer formation of soft magnetic biasing layers.

3. The read head of claim 2 wherein said symmetrically formed layers are intrinsically antiferromagnetic material comprising IrMn, with a thickness between approximately 50 and 200 Angstroms.

4. The read head of claim 1 wherein each of said pair of symmetrically formed antiferromagnetic layers formed on the top of said soft magnetic biasing layers or on the top of said multilayered formation of soft biasing layers is exchange coupled to said top shield of said top sensor or to said top shield of said bottom sensor and thereby provides a unidirectional magnetic anisotropy to each of said top shields as well as said biasing layers.

5. The read head of claim 1 wherein, in said bottom sensor, each of said pair of symmetrically formed antiferromagnetic layers is exchange coupled to each of said pair of soft magnetic biasing layers formed beneath said antiferromagnetic layers and is also exchange coupled to a top shield formed above said antiferromagnetic layers, thereby providing a unidirectional magnetic anisotropy to said top shield layer as well as to said pair of soft magnetic biasing layers.

6. The read head of claim 1 wherein said soft magnetic biasing layer is a multilayer of soft magnetic layers and wherein adjacent pairs of soft magnetic layers in said multilayer may be antiferromagnetically exchange coupled by means of an intermediate antiferromagnetically coupling layer but wherein said exchange coupled soft magnetic layers are formed with different thicknesses so that a net magnetic moment is produced for purposes of biasing said freelayer.

7. The read head of claim 6 wherein either or both individual layers of antiferromagnetically coupled adjacent pairs of soft magnetic layers may be exchange coupled to an antiferromagnetic layer.

8. The read head of claim 6 wherein said layer of antiferromagnetically coupling material is a layer of Ru and wherein said antiferromagnetic coupling is a negative exchange coupling.

9. The read head of claim 1 wherein said soft magnetic biasing layers may be formed of the soft magnetic alloys NiFe, CoFe, FeCo, Fe or their combinations.

10. The read head of claim 1 wherein said exchange coupling produces said unidirectional anisotropy as a result of an annealing process carried out at a temperature of between 200-250 deg. C., for a period of approximately 2 hours in a saturating magnetic field.

11. The read head of claim 1 wherein said symmetrically formed layers are intrinsically antiferromagnetic material comprising IrMn, with a thickness between approximately 50 and 200 Angstroms.

* * * * *